United States Patent
Kitamura et al.

(10) Patent No.: US 6,172,687 B1
(45) Date of Patent: Jan. 9, 2001

(54) MEMORY DEVICE AND VIDEO IMAGE PROCESSING APPARATUS USING THE SAME

(75) Inventors: Kenya Kitamura; Hiroshi Yagi; Keisuke Yasui, all of Tokyo (JP)

(73) Assignee: Sega Enterprises, Ltd. (JP)

( * ) Notice: Under 35 U.S.C. 154(b), the term of this patent shall be extended for 0 days.

(21) Appl. No.: 09/044,165

(22) Filed: Mar. 19, 1998

(30) Foreign Application Priority Data

Apr. 1, 1997 (JP) .................................................. 9-082534

(51) Int. Cl.[7] .................................................. G06F 12/06
(52) U.S. Cl. .................... 345/516; 345/430; 345/509; 711/5
(58) Field of Search .......................... 345/430, 507–510, 345/513, 515, 516, 517; 711/1, 5

(56) References Cited

U.S. PATENT DOCUMENTS

| | | | |
|---|---|---|---|
| 4,587,637 | * | 5/1986 | Ishizuka .......................... 365/189.04 |
| 4,639,890 | * | 1/1987 | Heilveil et al. ....................... 345/515 |
| 5,047,920 | * | 9/1991 | Funabashi ............................ 711/117 |
| 5,539,696 | * | 7/1996 | Patel .............................. 365/189.01 |
| 5,671,392 | * | 9/1997 | Parris et al. ......................... 711/148 |
| 5,691,955 | * | 11/1997 | Yamauchi ............................ 365/233 |
| 5,764,237 | * | 6/1998 | Kaneko ............................... 345/430 |

* cited by examiner

*Primary Examiner*—Kee M. Tung
(74) *Attorney, Agent, or Firm*—Dickstein Shapiro Morin & Oshinsky LLP

(57) ABSTRACT

A memory device in which a plurality of data can be read out by giving one address and a plurality of data can be read out without adding more address lines is provided, and therefore, the circuit integration is not degraded. The memory device includes: m memory array banks, each including row and column address decoders; a first circuit for receiving one address and generating m row addresses and n column addresses by shifting the one address by a predetermined value for each of the m row and n column addresses; and a second circuit for inputting each of the generated m row and n column addresses to the corresponding row and column address decoders of the m memory array banks.

8 Claims, 6 Drawing Sheets

FRAME BUFFER

MEMORY DEVICE AND VIDEO IMAGE PROCESSING APPARATUS USING THE SAME

BACKGROUND OF THE INVENTION

1. Field of the Invention

The present invention relates to a memory device which is suitable for storing and reading out texture data to be mapped on polygons forming an object displayed on a display device and a video image processing apparatus using the same.

2. Description of the Related Art

In recent years, video image processing apparatus has spread for displaying objects positioned in a virtual three-dimensional space by employing computer graphics. Additionally, research and development have been conducted to make the displayed objects close to virtual reality.

In the computer graphics, details on surfaces of a displayed object are called as textures. By reading texture data from a texture map and mapping them on every pixels of polygons forming an appropriate object, tone of color, grain and touch can be formed on the object.

FIGS. 8 and 9 are explanatory diagrams for mapping the texture data. FIG. 8 illustrates one example of a polygon which is developed on a two-dimensional coordinate plane to be displayed on a display device and stored in a frame buffer.

A polygon P shown in FIGS. 8 and 9 has three vertexes A, B, and C, each of which has one coordinate of X and Y axes on a texture map storing the texture data to be mapped as vertex data.

For example, a vertex A has coordinate data of ($T_{x0}$, $T_{y0}$) on the texture map, which indicates a position for storing the texture data mapped to the pixel of the vertex A. Vertexes B and C also have coordinate data of ($T_{x1}$, $Ty_1$) and ($T_{x2}$, $Ty_2$) respectively.

In addition, for example, for the pixel at a point D on a ridgeline between the vertexes A and B, coordinate data ($T_{xi}$, $T_{yi}$) on the texture map can be obtained by interpolating the coordinate data ($T_{x0}$, $T_{y0}$) of the vertex A and the coordinate data ($T_{x1}$, $Ty_1$) of the vertex B. For all of the other pixels forming the polygon P, coordinate data on the texture map can be similarly obtained by the interpolation.

On the other hand, on the texture map, each texture of the object is developed like a map and is stored in a memory device, for example, if the object is a rock, texture data for expressing a surface of the rock is developed like a map, and if the object is a tree, texture data for expressing a surface of the tree is developed like a map. In other word, the surface of a rock or tree is not uniform as defined by one data but is continuously varied.

The texture map is obtained by developing the textures, such as the surfaces of a rock or tree, on a plane of X and Y coordinate axes. Therefore, the textures of the surfaces of a rock or a tree cab be obtained by specifying the positions of the X and Y coordinate axes.

FIG. 10 is a diagram showing a relationship between a plane having two axes and one pixel of the polygon on the texture map. In FIG. 10, TP means an area of pixels specified by the X and Y coordinate axes on the texture map. Each area of the pixels has texture data. On the other hand, PP means one pixel forming a polygon, and PC means a center of the PP.

A position of the X and Y coordinate axes on the texture map can be specified corresponding to the pixel P. One pixel forming a polygon has dimensions as shown in FIG. 10. Therefore, one pixel forming a polygon is bestriding over a plurality of adjacent pixels on the texture map. Further, the texture on the surface of an object generally has continuity.

Therefore, the texture data for one pixel forming the polygon is generated by combining the plurality of adjacent pixel data on the texture map, which are overlapped to one pixel forming the polygon.

It is required to read out the texture data for the plurality of pixels from the texture map when generating the texture data for one pixel forming the polygon.

From the view point of video image processing in high speed, it is further preferable to concurrently read out texture data for a plurality of pixels.

However, it was difficult to specify two or more addresses concurrently to a data storage in conventional memory devices. Further, as a plurality of address lines were required for one data storage, it was also difficult to make circuit integration ratio higher in a conventional dual port memory.

SUMMARY OF THE INVENTION

Accordingly, it is an object of the present invention to provide a memory device from which a plurality of data can be read out by giving one address.

It is another object of the present invention to provide a memory device from which a plurality of data can be read out without providing additional address lines, thereby not degrading the circuit integration.

It is further object of the present invention to provide a texture memory device which is suitable to read out the texture data in high speed by using computer graphics.

It is furthermore object of the present invention to provide a video image processing apparatus using the memory device from which a plurality of data can be read out by giving one address for storing the texture map.

To attain the above-described problem, a first structure of a memory device according to the present invention includes: m memory array banks, each including row and column address decoders; a first circuit for receiving one address and generating m row addresses and n column addresses by shifting the one address by a predetermined value for each of the m row and n column addresses; and a second circuit for inputting each of the generated m row and n column addresses to the corresponding row and column address decoders of the m memory array banks.

Additionally, in a second structure of the memory device according to the first structure, the one address includes row and column addresses, the first circuit shifts each of the row and column addresses of the one address by a predetermined value to generate the m row and n column addresses, and the second circuit inputs the generated m row addresses to the corresponding row address decoders of the m memory array banks, and inputs the generated n column addresses commonly to the column address decoders corresponding to the m memory array banks.

A third structure of the memory device according to the second structure further includes: a third circuit for combining m×n data read out from the m memory array banks and outputting, at least, one combined data.

In a fourth structure of the memory device according to the third structure, the m and n are 2, and the one address is corresponding to a X and Y coordinate for specifying a position where one texture data is stored on a texture map of a video image processing apparatus.

Further, to attain the above-described problems, a first structure of an video image processing apparatus according to the present invention includes: a memory device storing a texture map to store texture data on a plurality of coordinate positions specified by X and Y axes; and a texture mapping circuit for mapping the texture data read out from the texture map on each of pixels forming each of the plurality of polygons, wherein the memory device includes; two memory array banks respectively including row and column address decoders, a first circuit for receiving one coordinate address specified by X and Y axes on the texture map and generating two addresses by shifting the one coordinate address by one, and a second circuit for inputting each of the generated two addresses to corresponding one of the address decoders of the address decoders of the two memory array banks.

In a second structure of the video image processing apparatus according to the present invention, the row address in each of the two memory array banks is corresponding to either an odd numbered address or an even numbered address of Y coordinate on the texture map.

In a third structure of the video image processing apparatus according to the present invention, the address decoders respectively corresponding to the two memory array banks include row and column address decoders, the one coordinate address includes a Y coordinate address in a Y direction and a X coordinate address in a X direction of the texture map, the first circuit generates two Y coordinate and two X coordinate addresses by shifting each of X and Y coordinate addresses of the one coordinate address by one, and the second circuit inputs each of the generated two Y coordinate addresses to corresponding one of the row address decoders of the two memory array banks, and the generated two X coordinate addresses commonly to the column decoders of the two memory array banks.

A fourth structure of the video image processing apparatus according to the third structure further includes: a third circuit for combining four texture data read out from the two memory array banks and outputting, at least, one combined texture data.

In a fifth structure of the video image processing apparatus according to the fourth structure, the third circuit mixes the four texture data concurrently read out from the two memory array banks according to a rate of a dimension to which one pixel forming a polygon is corresponding, and obtains one combined texture data.

DESCRIPTION OF THE PREFERRED EMBODIMENTS

Figure 1:
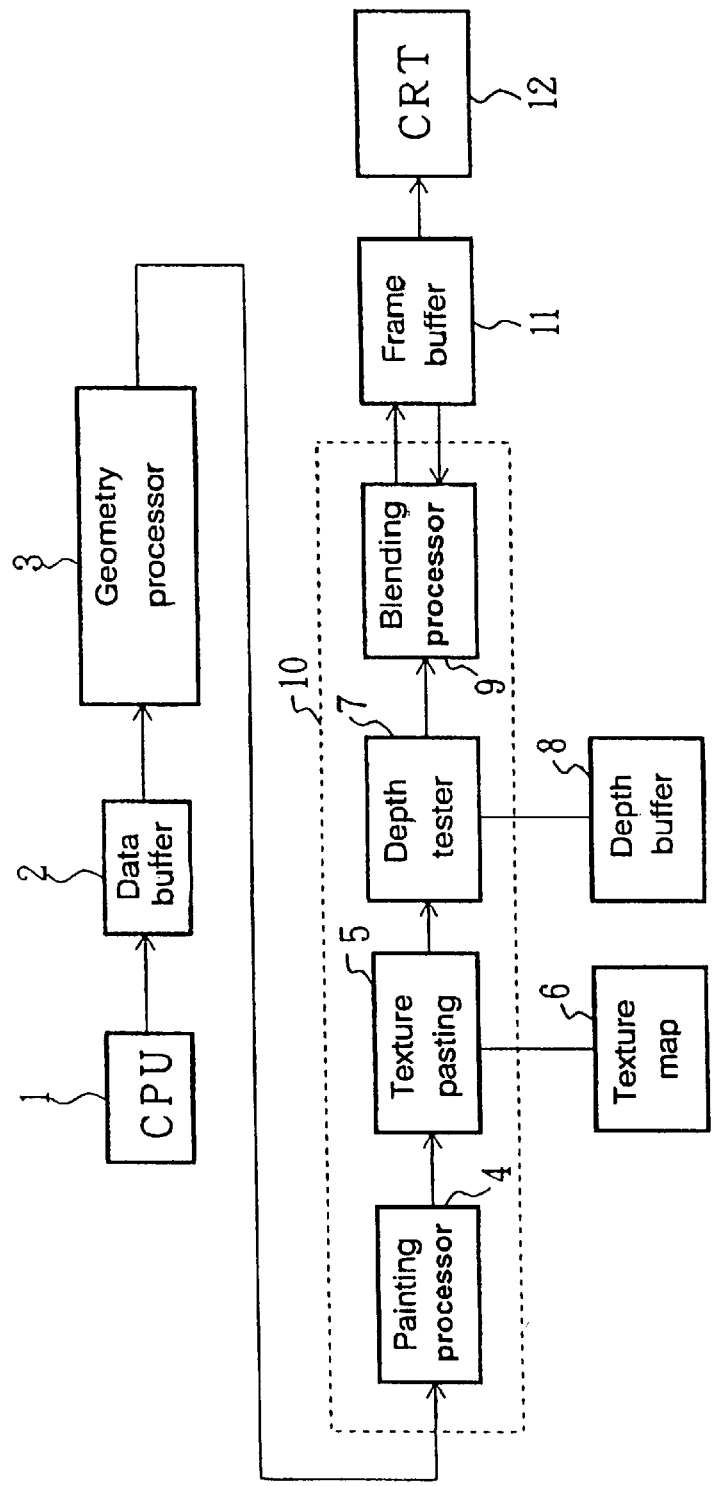
FIG. 1 shows a structural block diagram of a video image processing device using a memory device according to the present invention for storing a texture map.

Embodiments according to the present invention will be now explained in accompanying with the attached drawings. Throughout the following descriptions, the same reference numerals and symbols are used to denote and identify corresponding or identical components.

Additionally, only a case of employing a memory device according to the present invention for storing a texture map will be now explained as an embodiment of the present invention. However, the present invention is not restricted to the embodiment. The present invention can be applied in other specific forms when reading a plurality of data by giving one address.

FIG. 1 is a structural block diagram of a video image processing apparatus using a memory device according to the present invention for storing a texture map.

In FIG. 1, a CPU 1 controls a program execution for processing video images using polygons. A data buffer memory 2 is connected to CPU 1 and temporally stores vertex data of the polygon displayed on a display device 12 and register set functions as proceeding the program.

A geometry processor 3 is connected to data buffer 2 for positioning a polygon on a three-dimensional space according to the above-described data and converting the polygon on a two-dimensional coordinate axes to display on display device 12.

Additionally, a rendering processing section 10 is connected to geometry processor 3, and performs coloring, shading and mapping textures on each polygon to be displayed. A frame buffer 11 is connected to an output side of rendering processing section 10 to store the data for one screen to be displayed. Display device 12, such as a CRT display, is connected to the frame buffer 11 to subsequently display the contents of the frame buffer 11.

In this example, the above described geometry processor 3 reads out vertex data of a polygon, such as coordinates, colors, texture map coordinates, transparency, and normal line vector of vertexes, or a register set function as proceeding the program and according to the processing speed from data buffer 2.

Geometry processor 3 positions the polygon on a three-dimensional space according to vertex coordinate data, determines a view port showing the area to be displayed in a three dimensional space, and calculates brightness of each vertex according to the normal line vector. Geometry processor 3 removes, i.e., clips, the vertex of the polygon which is out of the view port. Geometry processor 3 further reflects the polygon positioned on the view port to two dimensional plane from a predetermined view point and converts the three-dimensional coordinates to two-dimensional coordinates.

The polygon data of which coordinates are converted to two-dimensional coordinates are transmitted to the rendering processing section 10. The rendering processing section 10 is formed of a painting processor 4, a texture mapping processor 5, a depth tester 7, and a blending processor 9.

Figure 8:
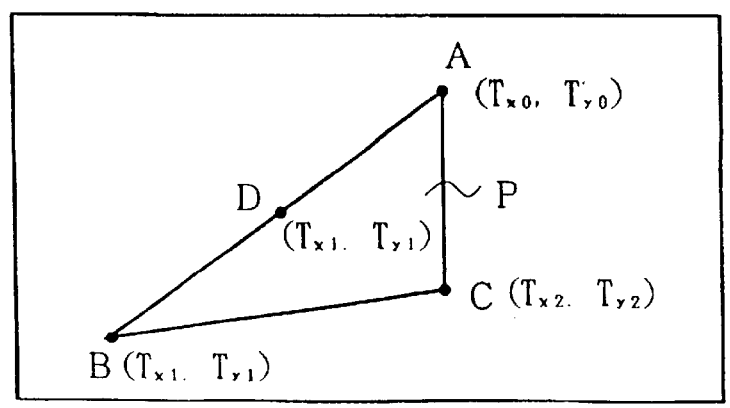
FIG. 8 shows one example of a polygon which is developed on a two-dimensional coordinate and is stored in a frame buffer to indicate on a display device, such as a CRT display.
Figure 9:
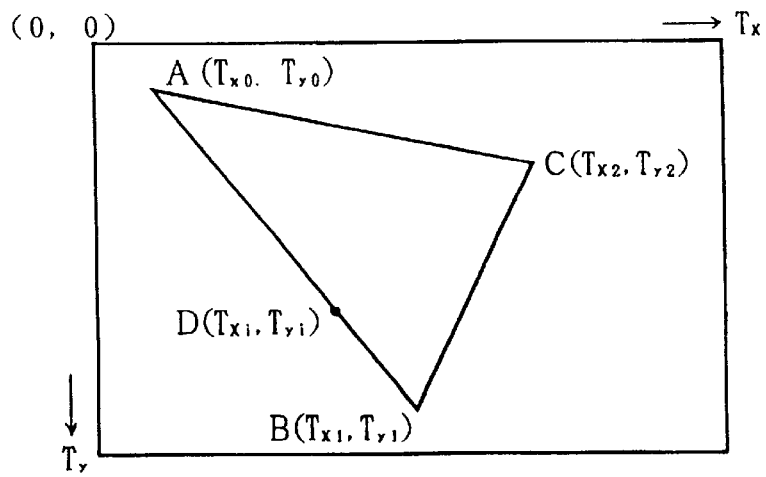
FIG. 9 is an explanatory diagram of mapping the texture data for each pixel of the polygon.

Painting processor 4 calculates information data of pixels within a range enclosed by vertexes of the polygon and passes the obtained data to each of other processors in rendering processing section 10. The above-described calculation is performed to obtain information data of pixels between vertexes of a polygon by, for example, performing a liner interpolation. The calculation is performed as the data of the pixel C is obtained from the vertex data of vertexes A and B as explained in FIG. 8.

Texture mapping processor 5 reads out the texture data corresponding to a pixel from texture map 6 and calculates to obtain color data of the pixel. A memory device 6 according to the present invention is employed in the structure of texture map 6.

Therefore, the structure of texture map 6 will be latter explained in detail as an embodiment of the present invention.

Depth tester 7 compares an order of the plurality of polygons and stores the data of the polygon positioned in the foreground to depth buffer 8. In other word, a Z value of the previously painted object (polygon) has been stored in depth buffer 8.

When a new polygon is displayed on a position overlapped to the previously painted polygon on the display, depth buffer 8 compares a Z value of each pixel forming a new polygon with that of the pixel of the previously painted polygon read out from depth buffer 8. As the result, when the pixel of the new polygon is in the more foreground than the pixel of previously painted polygon, the Z value of the pixel of the new polygon is written on depth buffer 8.

Blending processor 9 mixes color information data of the pixels of the previously painted polygon read out from frame buffer 11 with color information data of pixels of the new polygon and writes the mixed color information data to frame buffer 11. The information stored in frame buffer 11 are transmitted to and displayed on display device 12 per each display frame.

A structure of the embodiment of texture map memory device 6 according to the present invention provided in the video image processing apparatus having the above-described structure will be now explained. At first, the latter-described problem will be now considered by returning to FIG. 10.

As described above, when obtaining the texture data for each pixel forming a polygon, the pixel has a dimension on a position of coordinates on the texture map of the pixel. Then, the pixel is overlapped to the plurality of adjacent pixels on the texture map. Therefore, the texture data for each pixel forming the polygon is obtained by combining the plurality of adjacent pixel data on the texture map.

Figure 10:
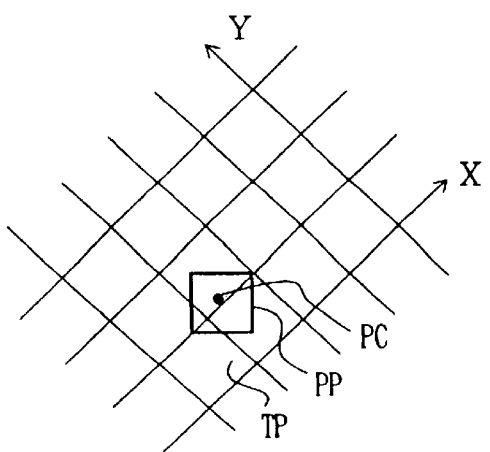
FIG. 10 illustrates a relationship between two axes plane on the texture map and one pixel of the polygon.

Therefore, it is required to perform calculation for combining the plurality of the texture pixel data. On the other hand, as shown in FIG. 10, there are many cases where directions of sides of one pixel PP forming the polygon and directions of X and Y axes of the texture map are not parallel in real. In this case, it becomes complex to perform combinational calculation of the above described texture pixel data.

Figure 6:
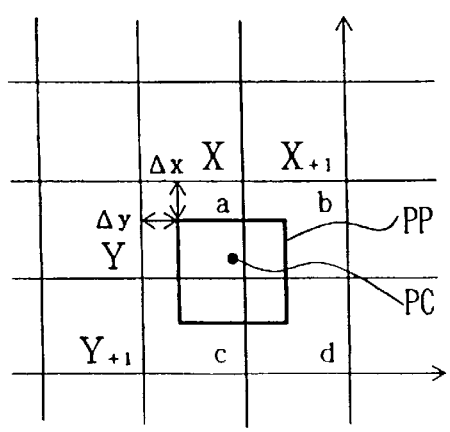
FIG. 6 is a diagram for explaining an equation for obtaining by combining each pixel of the polygon with a plurality of texture pixel data.

Then, it is general to calculate for combining the plurality of pixel data, as considering that the direction of sides of one pixel PP forming the polygon is parallel to the direction of X and Y axes of the texture map as shown in FIG. 6.

That is, in the example of FIG. 6, the coordinate positions on the texture map of the pixel PP of the polygon are corresponding to plural pixels a, b, c and d of the texture maps. In this case, a texture data $C_{PP}$ of the pixel PP can be obtained with a rate of overlapping the pixels a, b, c and d as follows:

$$C_{PP}=C_{X,Y}(1-\Delta x)(1-\Delta y)+C_{X+1,Y}\Delta(1-\Delta y)+C_{X,Y+1}(1-\Delta x)\Delta y+C_{X+1,Y+1}\Delta X\Delta y \quad (1)$$

where $C_{X,Y}$, $C_{X+1,Y}$, $C_{X,Y+1}$ and $C_{X+1,Y+1}$ are respectively texture data of the pixels a, b, c and d of the texture map.

Figure 2:
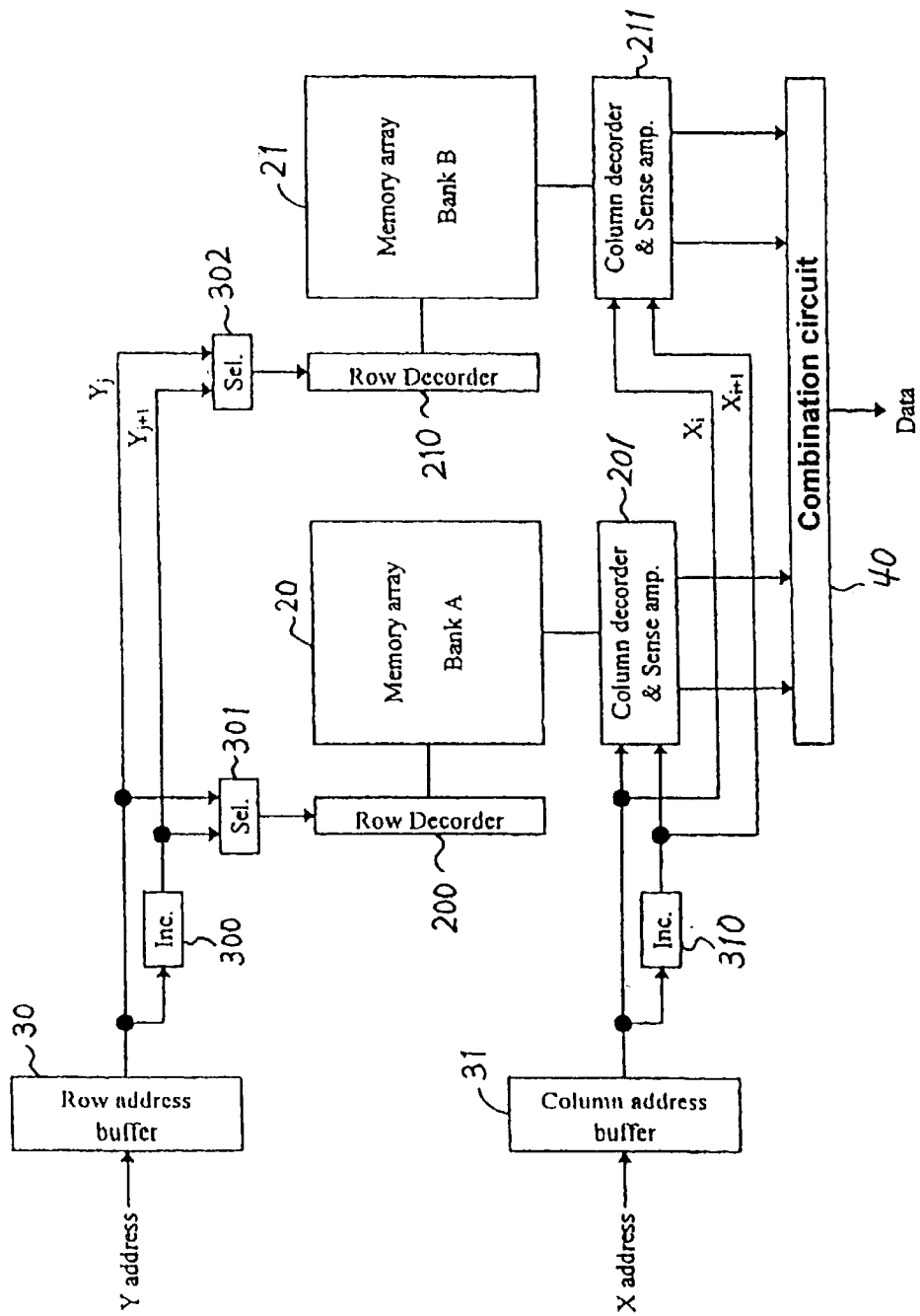
FIG. 2 is a block diagram of an embodiment of a texture map memory device according to the present invention.

FIG. 2 is a block diagram of the embodiment of texture map memory device 6 according to the present invention. In the embodiment of the present invention, the texture map having coordinates of X and Y axes is divided into two banks respectively having odd numbered Y axis and even numbered Y axis to store the texture data.

Therefore, texture map memory device 6 includes a first memory array bank 20 and a second memory array bank 21 which are divided into two banks in FIG. 2. First memory array bank 20 stores the texture data of odd numbered Y axes (A0, A1, A2 . . . shown in FIG. 7) of the texture map, and second memory array bank 21 stores the texture data of even numbered Y axes (B0, B1, B2 . . . shown in FIG. 7) of the texture map.

A row address decoder 200 and a column address decoder 201 are provided for first memory array bank 20, and a row address decoder 210 and a column address decoder 211 are provided for second memory array bank 21.

In general, memory device 6 includes a row address buffer 30, a column address buffer 31, increment circuits 300 and 310 for generating m row addresses and n column addresses corresponding to m memory array banks by inputting one address and shifting the address by a predetermined value. Additionally, it is possible to provide decrement circuits for decreasing instead of the increment circuits 300 and 310.

Figure 7:
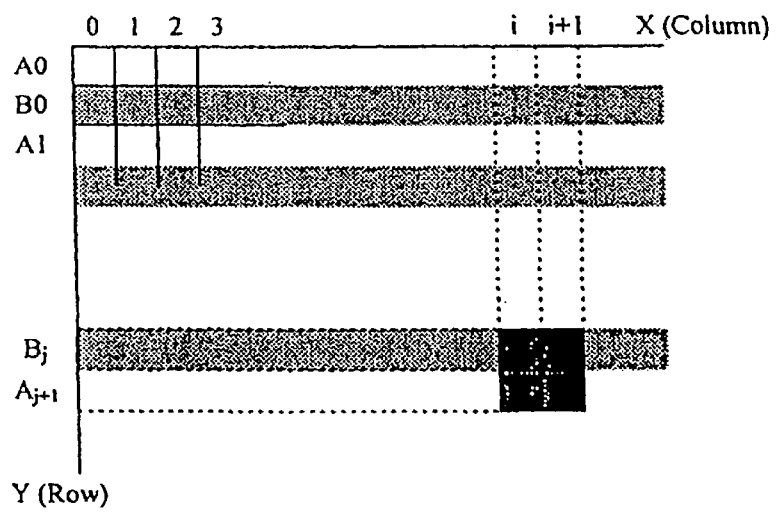
FIG. 7 is an explanatory diagram of a texture map having a X and Y coordinate axes.

In the embodiment of FIG. 2, a row address section and a column address section forming one address as shown in FIG. 7 are respectively inputted through buffer circuits 30 and 31, and four texture data [data of coordinates $(B_j, i)$, $(B_j, i+1)$, $(A_{j+1}, i)$ and $(A_{j+1}, i+1)$] are read out. Therefore, the texture map is divided into two of the odd numbered Y axis and the even numbered Y axes, and the texture data is stored in two memory array banks 20 and 21 as described above. In this case, m and n are m=n=2.

Further, the memory device 6 includes selectors 301 and 302 for selecting and inputting two row addresses generated from the row address section inputted from row address buffer 30 to address decoder 200 and 210 of the corresponding memory array banks 20 and 21.

In this structure, two column addresses generated from the column address section inputted from the column address buffer 31 are commonly inputted to column address decoders 201 and 211 of memory array banks 20 and 21 as an address selection input circuit.

Outputs of four texture data obtained from column address decoders 201 and 211 are led to combination circuit 40 to calculate the equation (1), which is above-described, and the result of the calculation is outputted as texture data of the appropriate pixel of the polygon.

In FIG. 2, inputs to address buffers 30 and 31 for one address and combination circuit 40 may be included in texture mapping processor 5 of rendering processing section 10 of FIG. 1 as needed.

Figure 3:
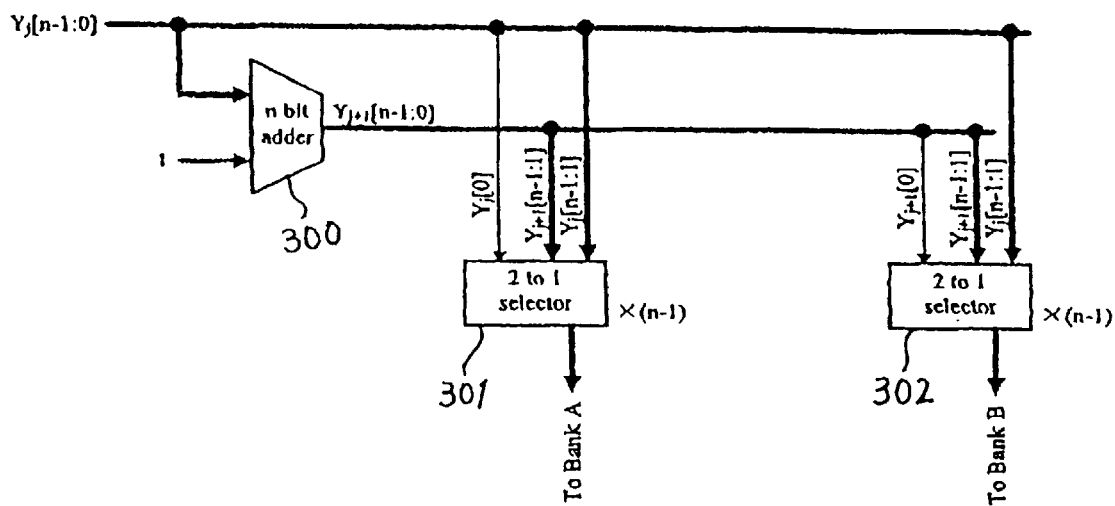
FIG. 3 is a block diagram for explaining a structural example of an increment circuit and selectors.

FIG. 3 is a block diagram for explaining a structural example of increment circuit 300, selectors 301 and 302. Increment circuit 310 on the column address side can be structured similarly to that of increment circuit 300. Therefore, illustration and explanation will be omitted here for simplicity.

In FIG. 3, increment circuit 300 is an adder of n bits. A row address $Y_j$, of the texture map formed of n bits and one bit of a logic "1" are inputted and added in increment circuit 300. Therefore, a row address $Y_j$ is incremented by one and the row address $Y_{j+1}$ is outputted.

Selectors 301 and 302 respectively include same selector circuits, each having two input and one output terminals for (n−1) bits. The higher (n−1) bits of the row address $Y_j$ except the least significant bit, i.e., LSB and the higher (n−1) bits of the row address $Y_{j+1}$, which is incremented by one except the least significant bit, i.e., LSB, are inputted to each selector 301 and 302.

Further, the least significant bit of the row address $Y_j$, i.e., LSB, is in putted to selector 301, and the least significant bit of the row address $Y_{j+1}$, i.e., LSB, is inputted to selector 302.

Therefore, selector 301 outputs $Y_{j+1}[n-1:1]$ when $Y_j[0]=1$, and $Y_j[n-1:1]$ when $Y_j[0]=0$. That means when the least significant bit of the row address $Y_j$ is a logic "1", selector 301 selects and outputs the higher (n−1) bit of the row address $Y_{j+1}$, and when it is a logic "0", selector 301 selects and outputs the higher level (n−1) bit of the row address $Y_j$. On the contrary, when $Y_{j+1}[0]=1$, selector 302 outputs $Y_{j+1}[n-1:1]$, and when $Y_{j+1}[0]=0$, selector 302 outputs $Y_j[n-1:1]$. That is, when LSB of the row address $Y_{j+}$ is logic "1", selector 302 selects and outputs the higher (n−1) bits of the row address $Y_{j+}1$, and when LSB is logic "0", selector 302 selects and outputs the higher (n−1) bits of the row address Even if the original inputted address $Y_j$ is an odd or even number, selector 301 outputs an even number from $Y_j$ and $Y_{j+1}$ and selector 302 outputs an odd number selected from $Y_j$ and $Y_j$.

Therefore, in FIG. 2, the texture data on every even numbered row including a zero numbered row are stored in memory array bank (A) 20 for the number of address rows which is starting with zero and the texture data on each odd numbered row are stored in memory array bank (B) 21 with relating to the texture map of FIG. 7. In other word, in FIG. 2, memory array bank (A) 20 includes only the texture data on even numbered rows, and the memory array bank (B) 21 includes only the texture data on odd numbered rows. Therefore, it is apparent that selectors 301 and 302 can select addresses correctly.

When the row address $Y_j$ is on odd numbered row, selector 301 outputs the higher level (n−1) bit of the row address $Y_j$, and selector 302 outputs the higher level (n−1) bit of the row address $Y_{j+}$.

Figure 4:
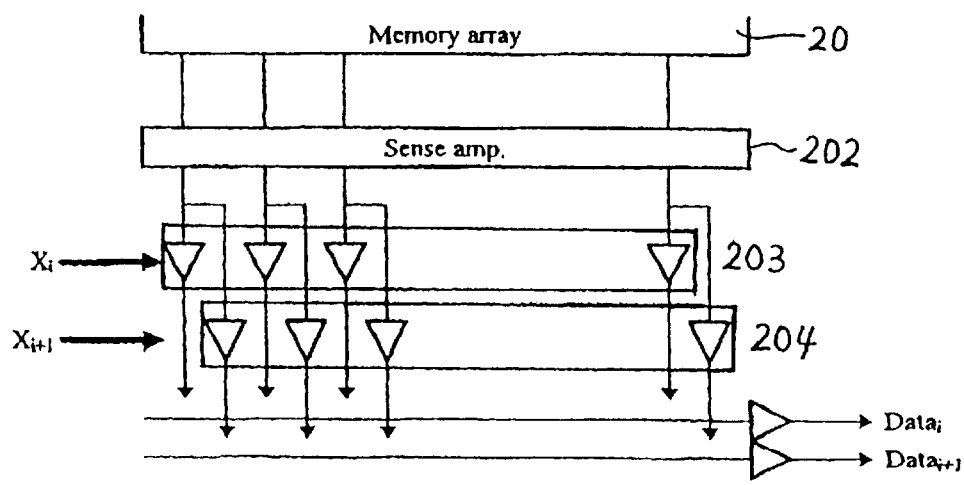
FIG. 4 shows a structural example of a row decoder of FIG. 2.

FIG. 4 is a structural example of column decoder 201 of FIG. 2. Column decoder 211 has the same structure as that of decoder 201. The column address $X_i$ outputted from column address buffer 31 and the column address $X_{i+1}$, shifted by one by increment circuit 310 are commonly inputted to column decoders 201 and 211 in memory array banks 20 and 21.

Column decoders 201 and 211 make one output gate of an output circuit 203 enable, and the output circuit 203 has output gates required for numbers of columns connected to bit lines in each row according to the column address $X_i$. On the other hand, column decoders 201 and 211 similarly make an output gate in an output circuit 204 enable, the output circuit 204 having output gates required for numbers of columns connected to bit lines in each column according to the column address $X_{i+1}$.

Therefore, each of column decoders 201 and 211 outputs two texture data which are positioned in rows adjacent two memory array banks 20 and 21 and are in one column, and therefore, outputs four texture data in total. The four texture data are inputted to combination circuit 40.

Figure 5:
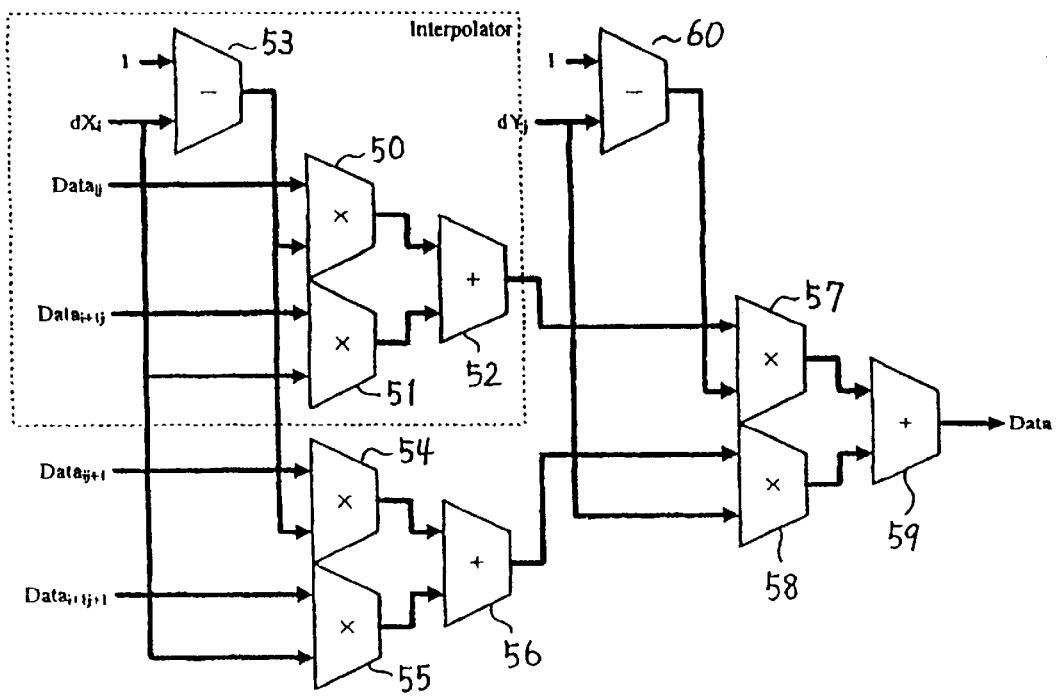
FIG. 5 is a structural block diagram of a combination circuit.

FIG. 5 is a structural block diagram of combination circuit 40. Combination circuit 40 obtains a result of the above-described equation (1) by the use of a combination of logical gate circuits as modified in the following equation (2).

That is, the equation (1) can be modified as follows:

$$C_{PP}=\{C_{X,Y}(1-\Delta X)+C_{X+1,Y}\Delta X\}(1-\Delta y)+\{C_{X,Y+1}(1-\Delta X)+C_{X+1,Y+1}\Delta X\}\Delta y \quad (2)$$

In FIG. 5, four texture data ($Data_{i,j}$, $Data_{i+1,j}$, $Data_{i,j+1}$ and $Data_{i+1,j+1}$) are corresponding to $C_{X,Y}$, $C_{X+1,Y}$, $C_{X,Y+1}$, and $C_{X+1,Y+1}$. Further, $d_{xi}$ and $d_{yj}$ are corresponding to $\Delta X$ and $\Delta Y$ of the equation (2).

Therefore, subtractors 53 and 60 respectively obtain $(1-\Delta x)$ and $(1-\Delta y)$. Multipliers 50, 51, 54 and 55 multiply $C_{X,Y}(1-\Delta)$, $C_{X+1,Y}\Delta X$, $C_{X,Y+1}(1-\Delta X)$, and $C_{X+1,Y+1}\Delta X$, respectively.

Adders 52 and 56 perform additions in the first and second brackets in the equation (2), respectively. Further, multiplier 57 performs a multiplication of the result of the addition in the first bracket and $(1-\Delta y)$, and multiplier 58 performs a multiplication of the result of the addition in the second bracket and $\Delta y$.

Further, adder 59 adds the outputs from multipliers 57 and 58. It becomes apparent to eXecute a combination of the texture data by employing the above-described equation (1) in combination circuit 40 having the structure of FIG. 5.

Therefore, it becomes possible to obtain the texture data to be mapped on each pixel forming a polygon by a combining calculation of the texture data, as explained relating to FIG. 6.

As explained the present embodiment in accompanying with the attached drawings, it becomes possible to concurrently read out a plurality of data by a memory device according to the present invention, thereby realizing to process the read data in high speed.

Further, the memory device according to the present invention is suitable for storing and reading out the texture data for the video image processing apparatus. Therefore, a video image processing apparatus which can display with computer graphics in higher speed can be provided.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A memory device comprising:
   m memory array banks, each including row and column address decoders;
   a first circuit for receiving one address and generating m row addresses and n column addresses by shifting the one address by a predetermined value for each of the m row and n column addresses;
   a second circuit for inputting each of the generated m row and n column addresses to the corresponding row and column address decoders of the m memory array banks;
   the m memory array banks outputting m×n data read out simultaneously by the generated m row and n column addresses; and
   a third circuit for calculating and outputting one output signal from the read-out m×n data according to a predetermined calculation formula.

2. The memory device according to claim 1,
   wherein the one address includes row and column addresses, said first circuit shifts each of the row and column addresses of said one address by a predetermined value to generate the m row and n column addresses, and said second circuit inputs the generated m row addresses to said corresponding row address decoders of said m memory array banks, and inputs said generated n column addresses commonly to said column address decoders corresponding to said m memory array banks.

3. The memory device according to claim 1, wherein the m and n are 2, and the one address is corresponding to a X and Y coordinate for specifying a position where one texture data is stored on a texture map of a video image processing apparatus.

4. A video image processing apparatus for forming an object positioned in a virtual three-dimensional space with a plurality of polygons and displaying on a display device, comprising:

a memory device storing texture data on a plurality of coordinate positions specified by X and Y axes; and a circuit for determining pixel data to be displayed according to the texture data read out from said memory device on each of pixels forming each of said plurality of polygons, wherein said memory device includes;

m memory array banks respectively including row and column address decoders, a first circuit for receiving one coordinate address specified by X and Y axes which specify texture data and generating multiple addresses by shifting said one coordinate address by a predetermined value, a second circuit for inputting each of said generated multiple addresses to corresponding one of the address decoders of said multiple memory array banks, and outputting plural texture data simultaneously, and a third circuit for calculating and outputting one output signal from read-out plural texture data according to a predetermined calculation formula.

5. The video image processing apparatus according to claim 4, wherein the m memory array banks include two memory array banks, and the second circuit outputs two addresses.

6. The video image processing apparatus according to claim 4, wherein the row address in each of the two memory array banks is corresponding to either an odd numbered address or an even numbered address of Y coordinate on the texture map.

7. The video image processing apparatus according to claim 4, wherein the determining circuit determines one pixel data to be displayed by combining multiple texture data read out from the m memory array banks.

8. The video image processing apparatus according to claim 4, wherein the determining circuit determines one pixel data to be displayed according to area assigned to one pixel in the multiple texture data.

* * * * *